United States Patent
Shekokar et al.

(10) Patent No.: US 10,181,035 B1
(45) Date of Patent: Jan. 15, 2019

(54) SYSTEM AND METHOD FOR .NET PE FILE MALWARE DETECTION

(71) Applicant: Symantec Corporation, Mountain View, CA (US)

(72) Inventors: Nitin Shekokar, Mountain View, CA (US); Kishor Kumar, Mountain View, CA (US)

(73) Assignee: SYMANTEC CORPORATION, Mountain View, CA (US)

(*) Notice: Subject to any disclaimer, the term of this patent is extended or adjusted under 35 U.S.C. 154(b) by 229 days.

(21) Appl. No.: 15/184,294

(22) Filed: Jun. 16, 2016

(51) Int. Cl.
   *G06F 21/56* (2013.01)
   *H04L 29/06* (2006.01)

(52) U.S. Cl.
   CPC ...... *G06F 21/563* (2013.01); *G06F 2221/033* (2013.01); *H04L 63/14* (2013.01)

(58) Field of Classification Search
   CPC .................................................. G06F 2221/033
   See application file for complete search history.

(56) References Cited

U.S. PATENT DOCUMENTS

| | | | | |
|---|---|---|---|---|
| 9,245,123 | B1* | 1/2016 | Satish | G06F 21/566 |
| 9,762,593 | B1* | 9/2017 | Kennedy | H04L 63/1416 |
| 2012/0017275 | A1* | 1/2012 | Harmonen | G06F 21/56 |
| | | | | 726/24 |
| 2014/0201208 | A1* | 7/2014 | Satish | G06F 21/564 |
| | | | | 707/737 |
| 2015/0172303 | A1* | 6/2015 | Humble | H04L 63/1408 |
| | | | | 726/23 |
| 2016/0094564 | A1* | 3/2016 | Mohandas | H04L 63/145 |
| | | | | 726/24 |
| 2017/0024561 | A1* | 1/2017 | Hajmasan | G06F 21/566 |

OTHER PUBLICATIONS

Andritsos, Periklis, and Vassilios Tzerpos. "Information-theoretic software clustering." IEEE Transactions on Software Engineering 31.2 (2005): 150-165. (Year: 2005).*
Suarez-Tangil, Guillermo, et al. "Dendroid: A text mining approach to analyzing and classifying code structures in android malware families." Expert Systems with Applications41.4 (2014): 1104-1117. (Year: 2014).*

(Continued)

*Primary Examiner* — Madhuri R Herzog
(74) *Attorney, Agent, or Firm* — Maschoff Brennan (57) ABSTRACT

A system and method for .Net PE files malware detection is provided. The method may include accessing two or more portable executable (PE) files and detecting at least one identical global user identifier (GUID) attribute. In response to finding identical GUID attributes, the method may include clustering a group of files into family clusters each having the same GUID attribute. The method may generate and release a signature for the family cluster. An exoneration criteria level may be set in accordance with matching characteristics associated with an acceptable software standard for the computing system or network, such that when the exoneration criteria level is reached, the PE file is exonerated from being associated with PUA or malware. Until this criterion is met, the PE file will be identified as PUA or malware. Additional GUID attributes may be identified as further proof that the PE file is polymorphic.

19 Claims, 6 Drawing Sheets

(56) References Cited

OTHER PUBLICATIONS

Battista P, Mercaldo F, Nardone V, Santone A, Visaggio CA. Identification of Android Malware Families with Model Checking. InICISSP Feb. 19, 2016 (pp. 542-547). (Year: 2016).*

Perdisci, Roberto. "VAMO: towards a fully automated malware clustering validity analysis." Proceedings of the 28th Annual Computer Security Applications Conference. ACM, 2012. (Year: 2012).*

Wallace, Brian; Using .NET Guids to Help Hunt for Malware; www.virusbtn.com/virusbulletin/archive/2015/06/vb201606-NET-GUIDs; Jun. 2015.

* cited by examiner

SYSTEM AND METHOD FOR .NET PE FILE MALWARE DETECTION

BACKGROUND

Malware may comprise any software used to gain access to private computer systems, gather sensitive information, disrupt computer operations, display unwanted advertising, and the like. In the alternative, grayware or Potentially Unwanted Applications (PUAs) represents unwanted applications or files, which are not classified as malware. Although these applications may have been downloaded by the user, the user may not be aware of the impact that these applications place upon the computing environment. For example, these applications may behave in an annoying or undesirable manner, with less serious or troublesome effects than malware; yet, PUAs can worsen the performance of computers and may cause security risks. PUAs may include but is not limited to, spyware, adware, fraudulent dialers, joke programs, remote access tools, and other unwanted programs that burden the performance of the computer system or pose a nuisance to the system and its users.

What complicates matters for PUAs, is that the developers of PUAs release new versions frequently. PUA designers also temper the precompiled files to create new user-defined versions of the PUA. Further, the designers use several packers and crypters; wherein, the packers represent software that are bundled into a single package that constantly changes its identity and crypters represent software that constantly mutates its signature. Thereby, the PUA becomes polymorphic, which makes it difficult to detect and remove. In particular, conventional antivirus software does not possess the ability to keep up with sorting and updating these PUA files. Currently, there is no generic solution to automatically distinguish between differing PUAs. Although antivirus software exists to identify a great variety of malware, there is no present solution for identifying PUA. It is within this context that the embodiments arise.

SUMMARY

Embodiments of a system and method for .Net PE File malware detection are provided. It should be appreciated that the present embodiment can be implemented in numerous ways, such as a process, an apparatus, a system, a device, or a method. Several inventive embodiments are described below.

In some embodiments, a system and method for .Net PE file malware detection is provided. The method may include accessing two or more portable executable (PE) files and detecting at least one identical global user identifier (GUID) attribute. In response to finding identical GUID attributes, the method may include clustering a group of files into family clusters each having the same GUID attribute. The method may generate and release a signature for the family cluster. An exoneration criteria level may be set in accordance with matching characteristics associated with an acceptable software standard for the computing system or network, such that when the exoneration criteria level is reached, the PE file is exonerated from being associated with PUA or malware. Until this criteria is met, the PE file will be identified as PUA or malware. Additional GUID attributes may be identified as further proof that the PE file is polymorphic.

In some embodiments, an antivirus system is provided. The antivirus system may include a memory and a processor operable to access two or more portable executable (PE) files and detect at least one identical global user identifier (GUID) attribute. In response to finding identical GUID attributes, the processor may be further operable to cluster a group of files into family clusters each having the same GUID attribute. The processor may be further operable to generate and release a signature for the family cluster. An exoneration criteria level may be set in accordance with matching characteristics associated with an acceptable software standard for the computing system or network, such that when the exoneration criteria level is reached, the PE file is exonerated from being associated with PUA or malware. Until this criteria is met, the PE file will be identified as PUA or malware. Additional GUID attributes may be identified as further proof that the PE file is polymorphic.

In some embodiments, a tangible, non-transitory, computer-readable media having instructions whereupon which, when executed by a processor, cause the processor to perform the dynamic PUA and malware detection method described herein. The method may include accessing two or more portable executable (PE) files and detecting at least one identical global user identifier (GUID) attribute. In response to finding identical GUID attributes, the method may include clustering a group of files into family clusters each having the same GUID attribute. The method may generate and release a signature for the family cluster. An exoneration criteria level may be set in accordance with matching characteristics associated with an acceptable software standard for the computing system or network, such that when the exoneration criteria level is reached, the PE file is exonerated from being associated with PUA or malware. Until this criteria is met, the PE file will be identified as PUA or malware. Additional GUID attributes may be identified as further proof that the PE file is polymorphic.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one so skilled in the art without departing from the spirit and scope of the described embodiments.

DETAILED DESCRIPTION

The following embodiments describe a system and method for .net portable executable (PE) file malware detection. It can be appreciated by one skilled in the art, that the embodiments may be practiced without some or all of these specific details. In other instances, well known process operations have not been described in detail in order not to unnecessarily obscure the embodiments.

The system may include a PUA/malware detection agent including a processor configured to detect PUAs and malware. The system and method may include accessing two or more portable executable (PE) files and detecting at least one identical global user identifier (GUID) attribute. In one embodiment, the GUID the attribute may include an attribute that defines the library type (TypeLib) or the attribute associated with the cyclic redundancy checksum (ICON CRC). In response to finding identical GUID attributes, the method may include clustering a group of files into family clusters each having the same GUID attribute. Further, the method may generate and release a signature for the family cluster. An exoneration criteria level may be set in accordance with matching characteristics associated with an acceptable software standard for the computing system or network, such that when the exoneration criteria level is reached, the PE file is exonerated from being associated with PUA or malware. For example, when the agent detects that a PE file possesses eight characteristics associated within an acceptable software standard, the PE file will be exonerated from being designated as PUA or malware. Until this criterion is met, the system identifies the PE file as PUA or malware.

In some embodiments, additional GUID attributes may be identified as further proof that the PE file is polymorphic. For example, the system may monitor pings and generate family clusters having the same Model Version ID (MVID). In one embodiment, when the system detects that the cluster contains greater than 10 files having the same MVID, the system may process this family cluster as polymorphic. Further, the system may detect whether the PE files within the family cluster possess the same Time Date Stamp. When the system detects that the PE files possess the same Time Date Stamp, the system may raise the exoneration criteria. For example, the system can raise the exoneration criteria necessitating that a relatively low reputation level must be matched from the acceptable software standard in order for the family cluster to be exonerated. In this way, the system detects whether PUA and malware exists with greater precision, through the use of an increasing amount of GUID attributes and the application of stricter exoneration criteria.

This novel system and method uses attributes which identify tempered files and malware families. In particular this method uses .NET GUIDs, such as TypeLib and MVID, for signature creation to block malware. Further, this method may efficiently use other GUID attributes, such as Time Date Stamp and Resource ICON CRC, with the combination of the .NET GUIDs.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "providing," "generating," "installing," "monitoring," "enforcing," "receiving," "logging," "intercepting", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Reference in the description to "one embodiment" or "an embodiment" means that a particular feature, structure, or characteristic described in connection with the embodiment is included in at least one embodiment of the invention. The phrase "in one embodiment" located in various places in this description does not necessarily refer to the same embodiment. Like reference numbers signify like elements throughout the description of the figures.

Figure 1:
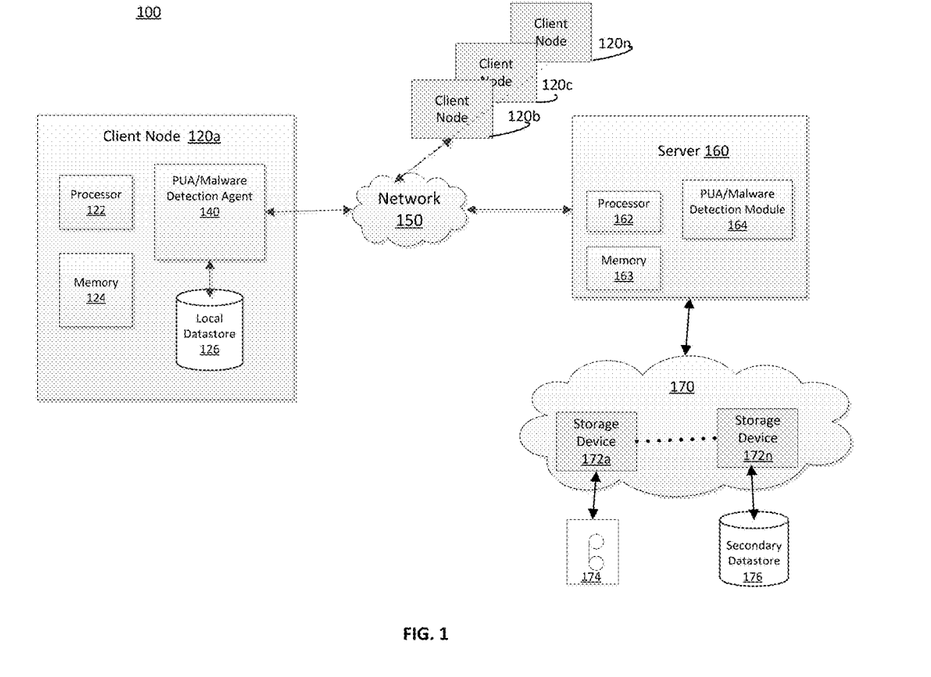
FIG. 1 is a system diagram of an antivirus networked computing system with multiple client nodes coupled to a server to provide networked antivirus protection, in accordance with some embodiments.

Referring to FIG. 1, a system diagram of an antivirus networked computing system with multiple client nodes coupled to a server to provide networked antivirus protection, in accordance with some embodiments is shown. The system includes at least one client node 120a-n, a network 150, at least one antivirus protection server 160, and a plurality of secondary storage devices 172, 174, and 176. Computing devices nodes 120a-n, with local data store 126, are coupled by a network 150 to the antivirus protection server 160 having its own PUA/malware detection module 164 and remote storage device 172a-n. Each client node 120a-n may include a PUA/malware detection agent 140, memory 124, a processor 122, and local data store 126. Examples of the client nodes 120a-n may include, but are not limited to, personal computers, laptops, PDAs, mobile phones, network appliances, and the like. In some embodiments, the PUA/malware detection agent 140 may serve as a device that communicates with the antivirus protection server 160 to perform the method of dynamic PUA and malware detection described more in detail below. In other embodiments, the PUA/malware detection module 164 within the antivirus protection server 160 may communicate with each client node 120a-n and serve as the sole agent that performs the method of dynamic PUA and malware detection described herein. The client nodes 120a-n, antivirus protection server 160, and the storage devices 172a-n may reside on the same LAN, or on different LANs that may be coupled together through the Internet, but separated by firewalls, routers, and/or other network devices. In one embodiment, client nodes 120a-n may couple to network 150 through a mobile communication network. In another embodiment, the client nodes 120a-n, antivirus protection server 160, and the storage devices 172a-n may reside on different networks. Although not shown, in various embodiments, the client node 120*a-n* may be notebook computers, desktop computers, microprocessor-based or programmable consumer electronics, network appliances, mobile telephones, smart telephones, pagers, radio frequency (RF) devices, infrared (IR) devices, Personal Digital Assistants (PDAs), set-top boxes, cameras, integrated devices combining at least two of the preceding devices, and the like.

The antivirus protection server 160 may include a processor 162, memory 163, and PUA/malware detection module 164. The PUA/malware detection module 164 may include processing software instructions and/or hardware logic required for dynamic PUA/malware detection according to the embodiments described herein. The antivirus protection server 160 may provide remote cloud storage capabilities of various PUA and malware identify characteristics and history, through the storage devices 172*a-n* coupled by network 170. Further, these may couple to one or more tape-out devices 174 or any other secondary datastore 176. The antivirus protection server 160 may also include a local data storage unit (not shown), which can be one or more centralized data repositories having mappings of respective associations between each fragment data and its location within a remote storage devices 172*a-n*. The local data store may represent a single or multiple data structures (databases, repositories, files, etc.) residing on one or more mass storage devices, such as magnetic or optical storage based disks, tapes or hard drives. This local data store may be an internal component of the antivirus protection server 160. The local data store also may couple externally to antivirus protection server 160, or remotely through a network. The antivirus protection server 160 can communicate with the remote storage devices 172*a-n* over a public or private network. Although not shown, in various embodiments, the antivirus protection server 160 may be a notebook computer, desktop computer, microprocessor-based or programmable consumer electronics, network appliance, mobile telephone, smart telephone, radio frequency (RF) device, infrared (IR) device, Personal Digital Assistant (PDA), set-top box, an integrated device combining at least two of the preceding devices, and the like.

The system may include remote data storage units and tape-out devices coupled by a network to client nodes 120*a-n*. As such, a database of PUA and malware unique characteristics may be stored within the local data store (126), remote disks 172*a-n*, secondary data store 176, or tape-outs devices 174. The database may include false positive history and the results of various testing including but not limited to polymorphic testing, exoneration criteria, and the like. In some embodiments, the client node 120*a* may retrieve previous results relating to a family cluster initially from a remote datastore to a local data store 126. In other embodiments, the database of PUA and malware unique characteristics may be stored locally on the client node 120*a-n* or the backup server 160.

In operation, the PUA/malware detection agent 140 may access two or more portable executable (PE) files representing one or more various software application packages. Further, agent 140 may detect at least one identical GUID attribute including but not limited to TypeLib, Resource ICON CRC, MVID, or Time Date Stamp. In one embodiment, agent 140 may detect whether the PE files possess identical TypeLib IDs and ICON CRCs, in an effort to cluster the PE files into a family cluster possessing the same GUID attribute. Additionally, PUA/malware detection agent 140 may generate a signature for each family cluster. An exoneration criteria level may be set by the agent 140; wherein, when a predetermined number of characteristics associated with an acceptable software standard is reached, the PE file associated with the signature is exonerated from being identified as PUA or malware. For example, the exoneration criteria may be set to a level of eight (8) matching characteristics associated with an acceptable software standard in one embodiment. Thereby, when agent 140 detects that a group of PE files match is eight differing characteristics associated with the standard, the group of PE files or the family cluster is exonerated from being identified as PUA or malware. Until the exoneration criterion is met, agent 140 may identify the family cluster as PUA or malware.

In some embodiments, further processing of the metadata associated with each PE file may be conducted by the PUA/malware detection agent 140 to detect various other polymorphic criteria. For example, agent 140 may monitor one or more pings associated with the software applications and extract the MVID. When particular files within the family cluster possess identical MVID, the PUA/malware detection agent 140 may group these files into a differing family cluster. Further, agent 140 may detect whether a polymorphic criterion has been reached for this differing family cluster. For example, the polymorphic criteria may be that the differing family cluster includes a number of PE files greater than a predetermined number (e.g. the predetermined number could be 10 PE files). Thereby, when the PE files are greater than 10, or some other threshold value, agent 140 designates the differing family cluster as polymorphic in one embodiment. Further, the PUA/malware detection agent 140 may remove the differing family cluster from memory; yet, maintain a history database locally (126) or remotely within the storage units 172*a-n*. When the PE files are 10 or less than 10, agent 140 may detect whether a zero false positive history exists; wherein a false positive history over a predetermined time after the signature release is absent of a false positive. In response to detecting less than 10 PE files or a zero false positive history, agent 140 may increase the exoneration criteria by a predetermined short level (e.g. by 1 point). This is indicative of an increased awareness of the presence of PUA or malware; yet, not as strongly detected as the polymorphic criteria.

There are several ways in which the PUA/malware detection agent 140 may extract the MVID. In some embodiments, agent 140 may convert the .NET assemblies back to a common intermediate language code and parse the MVID from the common intermediate language code. In other embodiments, the PUA/malware detection agent 140 may identify the GUID in a public code repository and parse the MVID from the public code repository. Further, agent 140 may parse the MVID from the PE file or the .NET metadata.

In other embodiments, the PUA/malware detection module 164 during operation may communicate with each client node 120*a-n* and serve as the sole agent that performs the method of dynamic PUA and malware detection described herein. For example, similar to the PUA/malware detection agent 140, detection module 164 may access two or more PE files representing one or more various software application packages. Further, module 164 may detect at least one identical GUID attribute including but not limited to TypeLib, Resource ICON CRC, MVID, or Time Date Stamp. In one embodiment, module 164 may detect whether the PE files possess identical TypeLib IDs and ICON CRCs, in an effort to cluster the PE files into a family cluster possessing the same GUID attribute. Additionally, module 164 may generate a signature for each family cluster. An exoneration criteria level may be set by the module 164; wherein, when a predetermined number of characteristics associated with an acceptable software standard is reached, the PE file associated with the signature is exonerated from being identified as PUA or malware. For example, the exoneration criteria may be set to a level of eight (8) matching characteristics associated with an acceptable software standard. Thereby, when PUA/malware detection module 164 detects that a group of PE files match is eight differing characteristics associated with the standard, the group of PE files or the family cluster is exonerated from being identified as PUA or malware. Until the exoneration criterion is met, module 164 identifies the family cluster as PUA or malware.

Further, PUA/malware detection module 164 may process the metadata associated with each PE file to detect various other polymorphic criteria. For example, module 164 may monitor one or more pings associated with the software applications and extract the MVID. When particular files within the family cluster possess identical MVID, the PUA/malware detection module 164 may group these files into a differing family cluster. Further, module 164 may detect whether a polymorphic criterion has been reached for this differing family cluster. For example, the polymorphic criteria may be that the differing family cluster includes a number of PE files greater than a predetermined number (e.g. the predetermined number could be 10 PE files). Additionally, module 164 may detect whether a zero false positive history exists by searching secondary storage devices or local data store. When a false positive history over a predetermined time after the signature release is absent of a false positive, module 164 may increase the exoneration criteria by a predetermined short level (e.g. by 1 point). In the alternative, module 164 may detect whether a predetermined number of files possessing identical and MVID exists. In response, module 164 may increase the exoneration criteria by the predetermined short level. This is indicative of an increased awareness of the presence of PUA or malware; where the detection is not as strong as a rendering of polymorphic status.

It is appreciated that the components of exemplary operating environment 100 are exemplary and more or fewer components may be present in various configurations. It is appreciated that operating environment may be part of a distributed computing environment, a cloud computing environment, a client server environment, and the like.

In other words, as would be apparent to one of ordinary skill in the art after reading this description, the various features and functionality described herein may be implemented in the antivirus architecture using any arrangement components necessary to perform the dynamic PUA and malware detection and other antivirus features (and functionality); and can be implemented in one or more separate or shared modules in various combinations and permutations. Further, the method of providing dynamic PUA and malware detection may be used for any computer system and network.

Figure 2A:
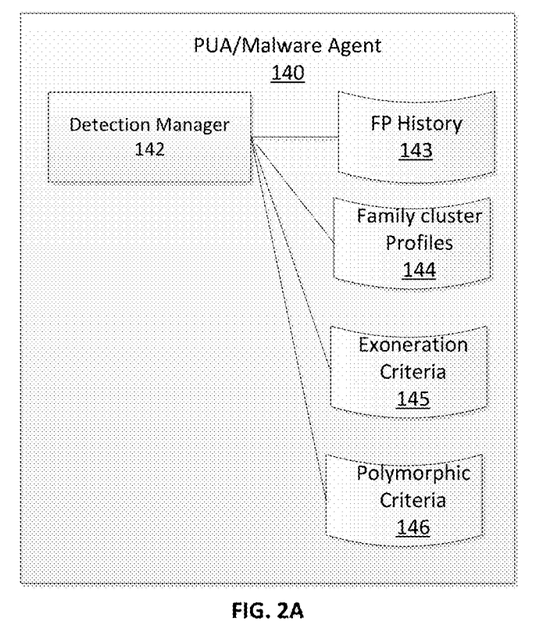
FIG. 2A is a block diagram showing the contents of a PUA/malware agent of FIG. 1 as an antivirus utility in some embodiments.

FIG. 2A is a block diagram showing the contents of a PUA/malware agent 140 of FIG. 1 as an antivirus utility in some embodiments. An exemplary embodiment of PUA/malware agent 140 is shown. Agent 140 may include a detection manager 142 in cooperation with false positive (FP) history 143, family cluster profiles 144, exoneration criteria 145, and polymorphic criteria 146. In operation, PUA/malware agent 140 may use previously detected family cluster profiles in order to identify PUA or malware. In the alternative, detection manager 142 may extract at least one GUID attribute and detect whether identical attribute exists for PE files. When identical GUID attributes exists, detection manager 142 can cluster a group of PE files into a family cluster and generate a signature for the family cluster. Further, detection manager 142 may retrieve the exoneration criteria level and detects whether a family cluster has reached the criteria level. When the criteria level has been reached, the detection manager 142 can exonerate the family cluster from being associated with PUA or malware. If the criteria level is not reached, the detection manager 142 may designate the family cluster to be associated with PUA or malware. Additionally, PUA/malware agent 140 may increase or decrease the exoneration criteria level in an effort to raise the bar on clearing a family cluster from being identified as PUA or malware.

In some embodiments, further processing of the metadata associated with each PE file may be conducted by the PUA/malware detection agent 140 to detect various other polymorphic criteria. For example, detection manager 142 may monitor one or more pings associated with the software applications and extract the MVID. When particular files within the family cluster possess an identical MVID, the detection manager 142 may group these files into a differing family cluster. Further, detection manager 142 may detect whether a polymorphic criterion has been reached for this differing family cluster. For example, the polymorphic criteria may be that the differing family cluster includes a number of PE files greater than a predetermined number (e.g. the predetermined number could be 10 PE files). Thereby, when the PE files are greater than 10, or some other threshold value, agent 140 designates the differing family cluster as polymorphic. Further, the PUA/malware detection agent 140 may remove the differing family cluster from memory; yet, maintain a history database locally (126) or remotely within the storage units 172*a-n*. When the PE files are 10 or less than 10, or some other threshold value selected besides 10, agent 140 may detect whether a zero false positive history exists; wherein a false positive history over a predetermined time after the signature release is absent of a false positive. In response to detecting less than 10 PE files or a zero false positive history, agent 140 may increase the exoneration criteria by a predetermined short level (e.g. by 1 point). This is indicative of an increased awareness of the presence of PUA or malware; yet, not as strongly detected as the polymorphic criteria.

There are several ways in which the detection manager 142 may extract the MVID or various other GUID attributes. In some embodiments, detection manager 142 may convert the .NET assemblies back to a common intermediate language code and parse the MVID from the common intermediate language code. In other embodiments, the detection manager 142 may identify the GUID in a public code repository and parse the MVID from the public code repository. Further, detection manager 142 may parse the MVID from the PE file or the .NET metadata. The detection manager 142 may extract the TypeLib ID from the blob heap or the CustomAttribute table of the PE file. The detection manager 142 may decompile the .NET assemblies for analysis to recover the TypeLib ID or the MVID. The detection manager 142 may extract the TypeLib ID using .NET to load the assembly in reflection-only mode. Since the GUI the is stored as an ASCII string in the resulting PE file, the detection manager 142 may parse the file using functions such as "string," "grep," "cut," and "head" on a Linux system to obtain the TypeLib ID.

Figure 2B:
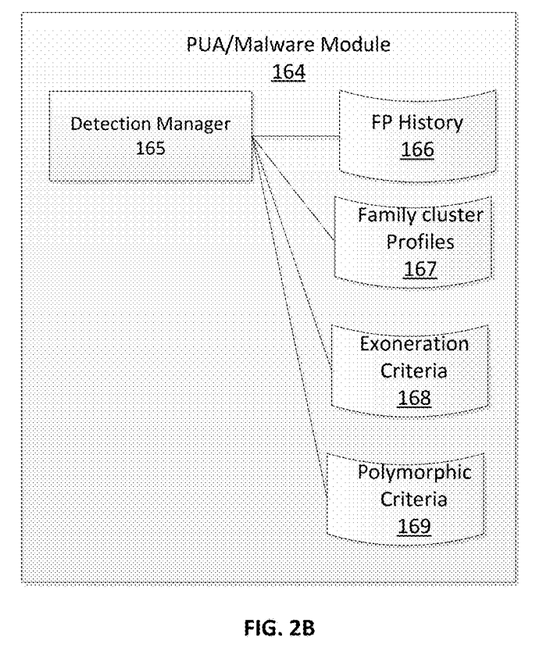
FIG. 2B is a block diagram showing the contents of a PUA/malware module of FIG. 1 as an antivirus utility in some embodiments.

Referring to FIG. 2B, the block diagram shows the contents of a PUA/malware module 164 of FIG. 1 as an antivirus utility in some embodiments. An exemplary embodiment of PUA/malware module 164 is shown. Similar to the agent 140, module 164 may include a detection manager 165 in cooperation with FP history 166, family cluster profiles 167, exoneration criteria 168, and polymorphic criteria 169. As noted previously, the PUA/malware detection module 164 in some embodiments may communicate with each client node 120a-n and serve as the sole agent that performs the method of dynamic PUA and malware detection. In operation, similar to the function and features of PUA/malware agent 140, the PUA/malware module 164 may use previously detected family cluster profiles in order to identify PUA or malware. In the alternative, module 164 may extract at least one GUID attribute and detect whether identical attribute exists for PE files. When identical GUID attributes exists, PUA/malware module 164 may cluster and generate a signature for the family cluster. Further, module 164 may retrieve the exoneration criteria level and detects whether a family cluster has reached the criteria level. When the criteria level has been reached, the PUA/malware module 164 can exonerate the family cluster from being associated with PUA or malware. If the criteria level is not reached, the module 164 may designate the family cluster to be associated with PUA or malware. Additionally, PUA/malware module 164 may increase or decrease the exoneration criteria level in an effort to raise the bar on clearing a family cluster from being identified as PUA or malware.

Similar to that of the PUA/malware detection agent 140, further processing of the metadata associated with each PE file may be conducted by the PUA/malware detection module 164 to detect various other polymorphic criteria. The detection manager 165 may include similar features and functions as the detection manager 142 noted above. For example, detection manager 165 may monitor one or more pings associated with the software applications and extract the MVID. When particular files within the family cluster possess an identical MVID, the detection manager 165 may group these files into a differing family cluster. Further, detection manager 165 may detect whether a polymorphic criterion has been reached for this differing family cluster. For example, the polymorphic criteria may be that the differing family cluster includes a number of PE files greater than a predetermined number (e.g. the predetermined number could be 10 PE files). Thereby, when the PE files are greater than 10, module 164 designates the differing family cluster as polymorphic. Further, the PUA/malware detection module 164 may remove the differing family cluster from memory; yet, maintain a history database locally (126) or remotely within the storage units 172a-n. When the PE files are 10 or less than 10, module 164 may detect whether a zero false positive history exists; wherein a false positive history over a predetermined time after the signature release is absent of a false positive. In response to detecting less than 10 PE files or a zero false positive history, module 164 may increase the exoneration criteria by a predetermined short level (e.g. by 1 point). This is indicative of an increased awareness of the presence of PUA or malware; yet, not as strongly detected as the polymorphic criteria.

As used herein, the term module might describe a given unit of functionality that can be performed in accordance with one or more embodiments of the present invention. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Figure 3A:
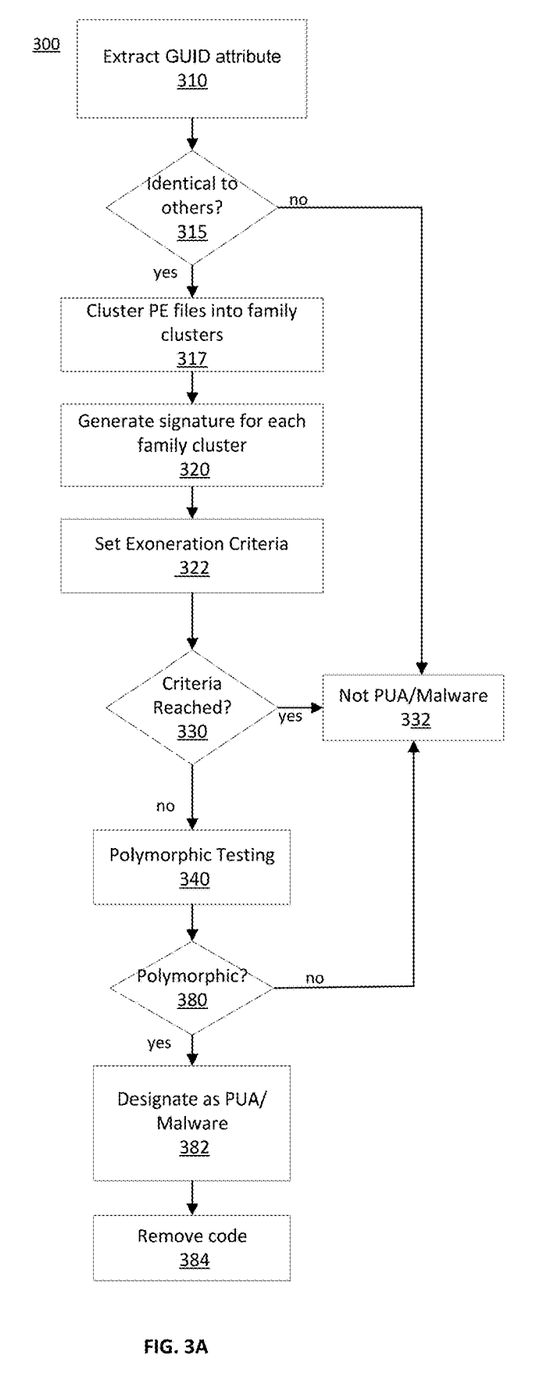
FIG. 3A is a flow diagram of a method for dynamically detecting PUA or malware in accordance with some embodiments.

FIG. 3A is an exemplary flow diagram of a method for dynamically detecting PUA or malware in accordance with some embodiments. In an action 310, the antivirus protection system 100 may extract at least one GUID attribute from each PE file. For example, PUA/malware detection agent 140 may extract the TypeLib ID or Resource ICON CRC from the PE file. The detection agent 140 may detect whether the extracted GUID attribute is identical to others in decision action 315. When the detection agent 140 identifies identical GUID attributes, PUA/malware detection agent 140 may cluster the PE files into a family cluster in an action 317, wherein each family cluster includes PE files possessing the same GUID attribute. Further, the detection agent 140 may generate a signature for each family cluster in action 320. The PUA/malware detection agent 140 may set the exoneration criteria in an action 322 and verify whether each family cluster has reached the exoneration criteria in decision action 330. When the exoneration criteria is not reached, the detection agent 140 may perform polymorphic testing in action 340. At the conclusion of the polymorphic testing, agent 140 may identify which family clusters are polymorphic in nature in decision action 380. If the family cluster is polymorphic, the detection agent 140 may designate the family cluster as PUA or malware in action 382. As a result, PUA/malware detection agent 140 may remove family cluster in action 384, and may collect a plurality of data points from sensors (150a-150c) or computing devices (160a-160c). These sensors or computing devices may be coupled locally or remotely to a data recovery module 122 located with the SLDS data recovery system 120. In the alternative, when the exoneration criteria is reached or when the family cluster does not exhibit polymorphic characteristics, detection agent 140 exonerates the family cluster in action 332.

Figure 3B:
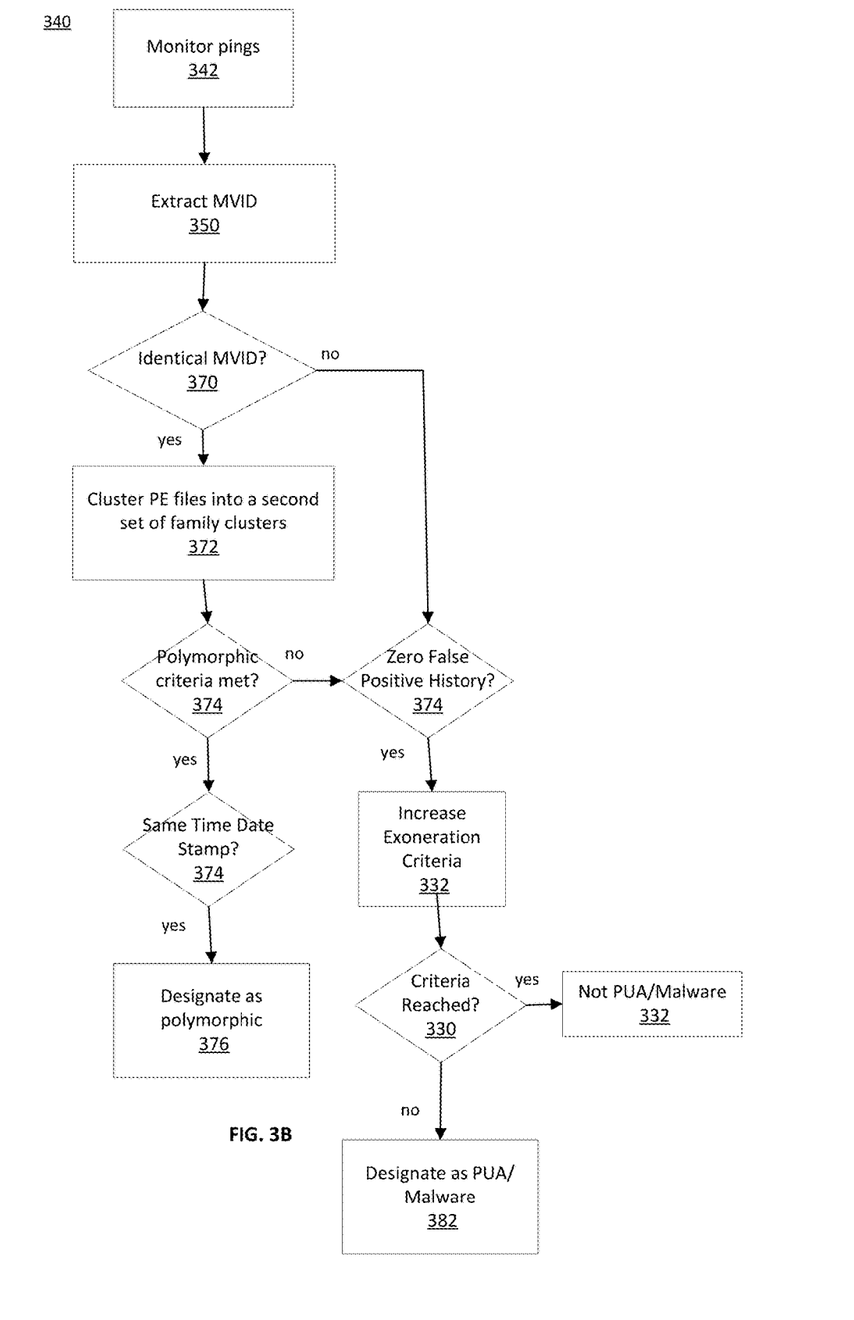
FIG. 3B is a flow diagram of a method for providing the polymorphic testing of FIG. 3A, in accordance with some embodiments.

Referring to FIG. 3B, an exemplary flow diagram of a method for providing polymorphic testing of FIG. 3A is provided. In some embodiments, the PUA/malware detection agent 140 may monitor pings of the software application in an action 342. The detection agent 140 may extract the MVID from the PE file in an action 350. When the MVID of one PE file is detected to be identical to the MVID of another PE file (in decision action 370), the detection agent 140 may cluster the PE files having identical MVID into a differing family cluster in an action 372. Further, agent 140 may detect whether a polymorphic criterion has been reached for this differing family cluster in decision action 374. For example, the polymorphic criteria may be that the differing family cluster includes a number of PE files greater than a predetermined number, where, for example, the predetermined number could be 10 PE files. Thereby, when the PE files are greater than 10, agent 140 may designate the differing family cluster as polymorphic in an action 376.

When the polymorphic criteria is not met, the PUA/malware detection agent 140 may detect whether a zero false positive history exists in a decision action 374; wherein a false positive history over a predetermined time after the signature release is absent of a false positive. In the alternative, agent 140 may detect whether a predetermined value of PE files possess an identical in MVID (not shown). For example, in response to detecting less than 10 PE files or a zero false positive history, agent 140 may increase the exoneration criteria by a predetermined short level (e.g. by 1 point) in action 332. Agent 140 may detect whether the exoneration criteria has been reached in a decision action 330. If it has been reached at this point, the agent 140 makes a determination that the family cluster is not PUA or malware in action 332. When the exoneration criterion is not reached, the agent 140 may designate the family cluster or differing family cluster as UA or malware in an action 382.

Figure 3C:
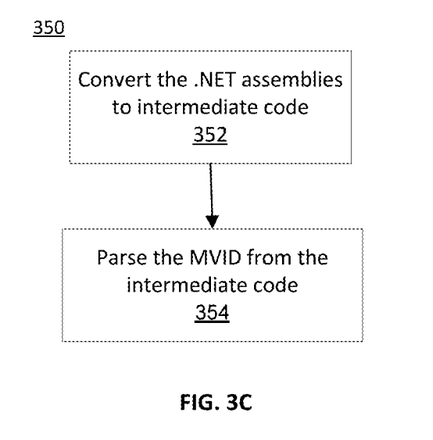
FIG. 3C-3E represent flow diagrams of three methods for extracting the MVID of FIG. 3B, in accordance with some embodiments
Figure 3D:
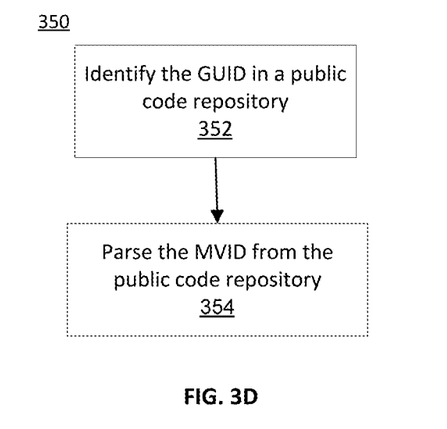
Figure 3E:
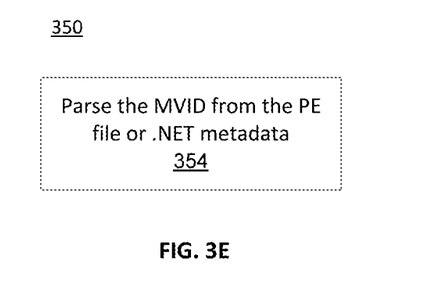

FIGS. 3C-3E represent flow diagrams of three methods for extracting the MVID of FIG. 3B. Referring to FIG. 3C, PUA/malware detection agent 140 may convert the .NET assemblies to intermediate code (in action 352) and parse the MVID from the intermediate code (in an action 354). As an alternative embodiment as shown in FIG. 3D, detection agent 140 may identify the GUID in a public code repository in an action 352. For example, the detection agent 140 may seek to find the GUID in a public code repository, such as GitHub. The detection agent 140 may also parse the MVID from the PE file or .NET metadata an action 354.

It should be noted that in some embodiments the action steps of the flowcharts as described above in FIGS. 3A-3E may be performed by PUA/malware detection module 164 in cooperation with the client nodes 120a-n. In the alternative, the method steps for dynamic PUA and malware detection as shown in FIGS. 3A-3E may be performed by a combination of agent 140 and module 164. For example, PUA/malware detection module 164 may perform the steps of FIG. 3A, while detection agent 140 performs the steps of FIGS. 3B-3E and vice a versa.

Figure 4:
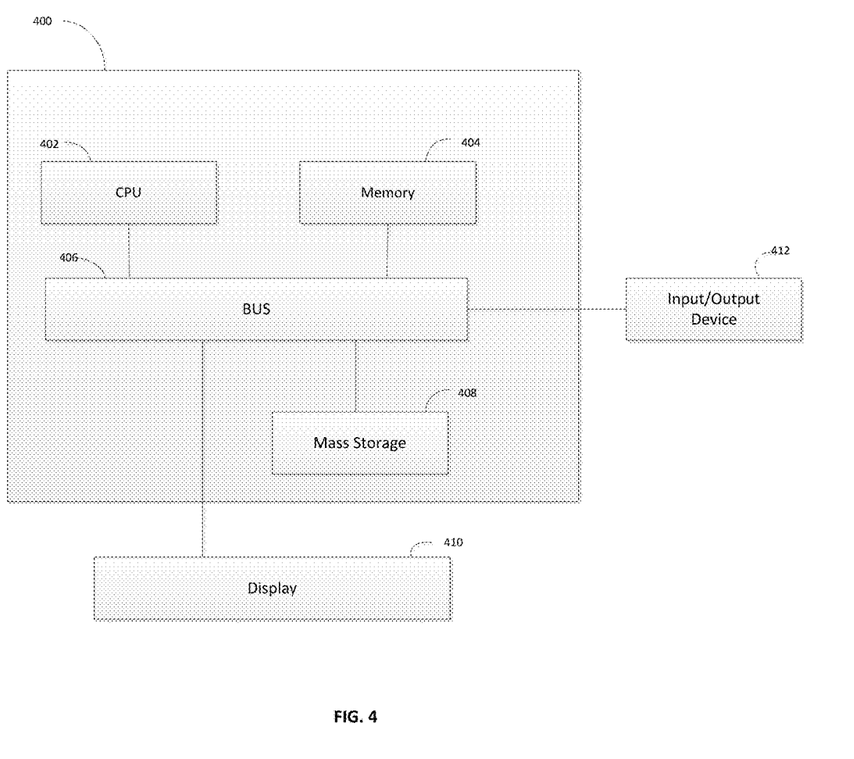
FIG. 4 is an illustration showing an exemplary computing device which may implement the embodiments described herein.

It should be appreciated that the methods described herein may be performed with a digital processing system, such as a conventional, general-purpose computer system. Special purpose computers, which are designed or programmed to perform only one function may be used in the alternative. FIG. 4 is an illustration showing an exemplary computing device which may implement the embodiments described herein. The computing device of FIG. 4 may be used to perform embodiments of the functionality for performing the dynamic PUA/malware detection in accordance with some embodiments. The computing device includes a central processing unit (CPU) 402, which is coupled through a bus 406 to a memory 404, and mass storage device 408. Mass storage device 408 represents a persistent data storage device such as a floppy disc drive or a fixed disc drive, which may be local or remote in some embodiments. The mass storage device 408 could implement a backup storage, in some embodiments. Memory 404 may include read only memory, random access memory, etc. Applications resident on the computing device may be stored on or accessed through a computer readable medium such as memory 404 or mass storage device 408 in some embodiments. Applications may also be in the form of modulated electronic signals modulated accessed through a network modem or other network interface of the computing device. It should be appreciated that CPU 402 may be embodied in a general-purpose processor, a special purpose processor, or a specially programmed logic device in some embodiments.

Display 412 is in communication with CPU 402, memory 404, and mass storage device 408, through bus 406. Display 412 is configured to display any visualization tools or reports associated with the system described herein. Input/output device 410 is coupled to bus 406 in order to communicate information in command selections to CPU 402. It should be appreciated that data to and from external devices may be communicated through the input/output device 410. CPU 402 can be defined to execute the functionality described herein to enable the functionality described with reference to FIGS. 1-3E. The code embodying this functionality may be stored within memory 404 or mass storage device 408 for execution by a processor such as CPU 402 in some embodiments. The operating system on the computing device may be iOS™, MS-WINDOWS™, OS/2™, UNIX™, LINUX™, or other known operating systems. It should be appreciated that the embodiments described herein may be integrated with virtualized computing system also.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

It is to be understood that the above description is intended to be illustrative, and not restrictive. Many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "I" symbol includes any and all combinations of one or more of the associated listed items. As used herein, the singular forms "a", "an" and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved. With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

A module, an application, a layer, an agent or other method-operable entity could be implemented as hardware, firmware, or a processor executing software, or combinations thereof. It should be appreciated that, where a software-based embodiment is disclosed herein, the software can be embodied in a physical machine such as a controller. For example, a controller could include a first module and a second module. A controller could be configured to perform various actions, e.g., of a method, an application, a layer or an agent.

The embodiments can also be embodied as computer readable code on a non-transitory computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, flash memory devices, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Various units, circuits, or other components may be described or claimed as "configured to" perform a task or tasks. In such contexts, the phrase "configured to" is used to so connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware; for example, circuits, memory storing program instructions executable to implement the operation, etc. Reciting that a unit/circuit/component is "configured to" perform one or more tasks is expressly intended not to invoke 35 U.S.C. 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method for dynamically detecting potentially unwanted applications (PUAs) and malware, comprising:
   accessing two or more portable executable (PE) files;
   extracting at least one global user identifier (GUID) attribute from each of the two or more PE files;

detecting an identical GUID attribute from the two or more PE files;
clustering, in response to the detection of the identical GUID attribute, the two or more PE files into a first family cluster;
generating a signature for the first family cluster, wherein the signature is based on the GUID attribute;
setting a first exoneration criteria level for the first family cluster to a first predetermined level;
monitoring one or more pings sent from software applications represented by the two or more PE files within the first family cluster;
extracting a module version identifier (MVID) associated with each of the two or more PE files based on the one or more pings;
detecting an identical MVID for a subset of PE files within the first family cluster;
clustering, in response to the detection of the identical MVID, the subset of PE files into a second family cluster;
detecting whether the subset of PE files in the second family cluster have a same Time Date Stamp;
setting, in response to the detected same Time Date Stamp, a second exoneration criteria level for the second family cluster to a second predetermined level;
determining for the first and second family clusters whether the first and second exoneration criteria levels, respectively, have been reached;
exonerating, in response to a determination that the first and second exoneration criteria levels have been reached, the first and second family clusters, respectively, from being associated with PUA or malware; and
identifying, in response a determination that the first and second exoneration criteria levels have not been reached, the first and second family clusters, respectively, as PUA or malware.

2. The method of claim 1, further comprising:
identifying each of the PE files in the second family cluster as polymorphic; and
removing the identified polymorphic PE files from memory.

3. The method of claim 2, further comprising:
detecting whether the second family cluster has less than 10 PE files; and
increasing, in response to detecting less than 10 PE files in the second family cluster, the second exoneration criteria to a third predetermined level.

4. The method of claim 1, wherein the extracting MVID comprises:
converting .NET assemblies back to a common intermediate language code; and
parsing the MVID from the common intermediate language code.

5. The method of claim 1, wherein the extracting MVID comprises:
identifying the GUID in a public code repository; and
parsing the MVID from the public code repository.

6. The method of claim 1, wherein the extracting MVID comprising:
parsing the MVID from the PE file or .NET metadata.

7. The method of claim 1, wherein the first predetermined level is set to an identified 8 characteristics of acceptable applications.

8. The method of claim 1, further comprising detecting if a polymorphic criteria has been met for the second family cluster, wherein the polymorphic criteria is the second family cluster includes greater than a predetermined number of PE files.

9. The method of claim 8, wherein the predetermined number of PE files is 10.

10. The method of claim 1, wherein the second predetermined level is set to an identified threshold of reputation characteristics of acceptable applications.

11. An antivirus system comprising:
a memory storing programmed instructions; and
a processor operable to execute the programmed instructions to:
access two or more portable executable (PE) files;
extract at least one global user identifier (GUID) attribute from each of the two or more PE files;
detect an identical GUID attribute from the two or more PE files;
cluster, in response to the detection of the identical GUID attribute, the two or more PE files into a first family cluster;
generate a signature for the first family cluster, wherein the signature is based on the GUID attribute;
set a first exoneration criteria level for the first family cluster to a first predetermined level;
monitor one or more pings sent from software applications represented by the two or more PE files within the first family cluster;
extract a module version identifier (MVID) associated with each of the two or more PE files based on the one or more pings;
detect an identical MVID for a subset of PE files within the first family cluster;
cluster, in response to the detection of the identical MVID, the subset of PE files into a second family cluster;
detect whether the subset of PE files in the second family cluster have a same Time Date Stamp;
set, in response to the detected same Time Date Stamp, a second exoneration criteria level for the second family cluster to a second predetermined level;
determine for the first and second family clusters whether the first and second exoneration criteria levels, respectively, have been reached;
exonerate, in response to a determination that the first and second exoneration criteria levels have been reached, the first and second family clusters, respectively, from being associated with a potentially unwanted application (PUA) or malware; and
identify, in response a determination that the first and second exoneration criteria levels have not been reached, the first and second family clusters, respectively, as PUA or malware.

12. The antivirus system of claim 11, wherein the processor is further operable to:
identify each of the PE files in the second family cluster as polymorphic; and
remove the identified polymorphic PE files from memory.

13. The antivirus system of claim 12, wherein the processor is further operable to:
detect whether the second family cluster has less than 10 PE files; and
increase, in response to detecting less than 10 PE files in the second family cluster, the second exoneration criteria to a third predetermined level.

14. A non-transitory computer-readable medium including code for performing a method, the method comprising:
accessing two or more portable executable (PE) files;

extracting at least one global user identifier (GUID) attribute from each of the two or more PE files;

detecting an identical GUID attribute from the two or more PE files;

clustering, in response to the detection of the identical GUID attribute, the two or more PE files into a first family cluster;

generating a signature for the first family cluster, wherein the signature is based on the GUID attribute;

setting a first exoneration criteria level for the first family cluster to a first predetermined level;

monitoring one or more pings sent from software applications represented by the two or more PE files within the first family cluster;

extracting a module version identifier (MVID) associated with each of the two or more PE files based on the one or more pings;

detecting an identical MVID for a subset of PE files within the first family cluster;

clustering, in response to the detection of the identical MVID, the subset of PE files into a second family cluster;

detecting whether the subset of PE files in the second family cluster have a same Time Date Stamp;

setting, in response to the detected same Time Date Stamp, a second exoneration criteria level for the second family cluster to a second predetermined level;

determining for the first and second family clusters whether the first and second exoneration criteria levels, respectively, have been reached;

exonerating, in response to a determination that the first and second exoneration criteria levels have been reached, the first and second family clusters, respectively, from being associated with a potentially unwanted application (PUA) or malware;

identifying, in response a determination that the first and second exoneration criteria levels have not been reached, the first and second family clusters, respectively, as PUA or malware.

15. The computer-readable medium of claim 14, further comprising:

identifying each of the PE files in the second family cluster as polymorphic; and removing the identified polymorphic PE files from memory.

16. The computer-readable medium of claim 15, further comprising:

detecting whether the second family cluster has less than 10 PE files; and increasing, in response to detecting less than 10 PE files in the second family cluster, the second exoneration criteria to a third predetermined level.

17. The method of claim 1, wherein the at least one GUID attribute identifies a library type (TypeLib).

18. The antivirus system of claim 11, wherein the at least one GUID attribute identifies a library type (TypeLib).

19. The computer-readable medium of claim 14, wherein the at least one GUID attribute identifies a library type (TypeLib).

* * * * *